US008174849B2

(12) United States Patent
Gekinozu

(10) Patent No.: US 8,174,849 B2

(45) Date of Patent: May 8, 2012

(54) ELECTRIC POWER CONVERTER WITH SOFT SWITCHING FOR TWO WAY POWER CONVERSION

(75) Inventor: Masakazu Gekinozu, Matsumoto (JP)

(73) Assignee: Fuji Electric Co., Ltd., Kawasaki-Shi, Kanagawa (JP)

( * ) Notice: Subject to any disclaimer, the term of this patent is extended or adjusted under 35 U.S.C. 154(b) by 0 days.

(21) Appl. No.: 13/067,402

(22) Filed: May 31, 2011

(65) Prior Publication Data

US 2011/0286246 A1 Nov. 24, 2011

Related U.S. Application Data

(63) Continuation-in-part of application No. 12/379,392, filed on Feb. 20, 2009, now abandoned.

(30) Foreign Application Priority Data

Feb. 28, 2008 (JP) ................................ 2008-047706

(51) Int. Cl.
*H02M 5/27* (2006.01)

(52) U.S. Cl. ................................ 363/10; 363/8; 363/16

(58) Field of Classification Search ................ 363/8, 10, 363/15, 16, 20, 21.01, 21.04, 131, 132
See application file for complete search history.

(56) References Cited

U.S. PATENT DOCUMENTS 7,218,081 B2 * 5/2007 Jang et al. .................... 323/266
7,541,791 B2 * 6/2009 Quazi .......................... 323/282

* cited by examiner

*Primary Examiner* — Jue Zhang
*Assistant Examiner* — Lakaisha Jackson
(74) *Attorney, Agent, or Firm* — Manabu Kanesaka

(57) ABSTRACT

An electric power converter facilitates performing soft switching in the two-way electric-power-conversion operation thereof, and reducing the manufacturing costs thereof and the losses caused therein, The electric power converter includes a first switching device; a second switching device; a first series circuit including capacitor, a diode, the primary winding of transformer, and a third switching device; a second series circuit including a capacitor, a fourth switching device, the primary winding of transformer, and a diode; a third series circuit including a diode and the secondary winding of transformer; and a voltage clamping element connected in parallel to the primary winding of transformer. The first series circuit is connected in parallel to the first switching device, and the second series circuit is connected in parallel to second switching device. The third series circuit is connected between the DC output terminals.

3 Claims, 10 Drawing Sheets

ELECTRIC POWER CONVERTER WITH SOFT SWITCHING FOR TWO WAY POWER CONVERSION

CROSS-REFERENCE TO RELATED APPLICATION

This is a continuation-in-part of U.S. patent application Ser. No. 12/379,392 filed on Feb. 20, 2009 now abandoned.

BACKGROUND OF THE INVENTION AND RELATED ART STATEMENT

The present invention relates to an electric power converter that generates a DC output from a DC power supply or from an AC power supply. Specifically, the present invention relates to the soft switching function of an electric power converter capable of conducting two-way operations.

The circuit of a conventional electric power converter capable of conducting two-way operations is disclosed in the following Patent Document 1: Japanese Unexamined Patent Application Publication No. 2004-147475. The conventional circuit disclosed in the Patent Document 1 is shown in FIG. 3A.

The conventional circuit shown in FIG. 3A is described in connection with a single-phase AC power supply. The conventional circuit consists of a rectifier circuit including a diode bridge circuit having diodes 2 through 5, and a chopper circuit including reactor 21, diode 6, and switching device 15.

As switching device 15 is turned on, AC power supply 1 is short-circuited via the diode bridge circuit and reactor 21, energy is stored in reactor 21, and an AC input current increases.

Then, as switching device 15 is turned off, the energy stored in reactor 21 is fed via diode 6 to capacitor 33 and load 34, which constitute a DC output.

By controlling the ON and OFF of switching device 15, a rectified AC voltage (DC voltage) is converted to an arbitrary DC voltage. A soft switching circuit for the chopper circuit is configured by capacitor 31, diodes 7, 9, 10, voltage clamping element 30, transformer 22 and switching device 17.

FIG. 3B is a wave chart describing the operations of the circuit shown in FIG. 3A.

As switching device 17 is turned on, the current that circulates, during a period t1, from reactor 21 to reactor 21 via diode 6, capacitor 33, diode bridge circuit 40, and AC power supply 1 gradually changes the current path so as to circulate, due to the influence of the leakage inductance of transformer 22, from reactor 21 to reactor 21 via diode 7, primary winding 22*a* of transformer 22, switching device 17, diode bridge circuit 40, and AC power supply 1. Since the current that flows through switching device 17 increases gradually from zero during the commutation described above, switching device 17 performs soft switching at the turn-ON thereof.

Then, a period t2 starts. During the period t2, the current flowing through switching device 17 becomes equal to the current flowing through reactor 21 and diode 6 becomes OFF. Since the current flowing through diode 6 decreases gradually to zero, the surge voltage and the reverse recovery losses caused by the reverse recovery are reduced. At the same time, the electric charge stored in capacitor 31 (or in the parasitic capacitance of switching device 15) is discharged via a path connecting capacitor 31, diode 7, primary winding 22*a* of transformer 22, switching device 17, and capacitor 31. The electric charge stored in capacitor 31 is regenerated to the output side via secondary winding 22*b* of transformer 22 and diode 10.

By turning on switching device 15 after the voltage thereof lowers to zero in a period t3, a difference current, which is the difference between the current flowing through primary winding 22*a* of transformer 22 and the current flowing through reactor 21, flows through switching device 15. Since the difference current that flows through switching device 15 initially flows through parasitic diode 12, the current that flows through switching device 15 increases gradually from a negative value. Therefore, switching device 15 performs soft switching at the state of the turn-ON thereof.

Then, the current that has been circulating from reactor 21 to reactor 21 via diode 7, primary winding 22*a* of transformer 22, switching device 17, diode bridge circuit 40, and AC power supply 1 gradually changes so as to circulate from reactor 21 to reactor 21 via switching device 15, diode bridge circuit 40, and AC power supply 1. At the same time, the energy stored in the leakage inductance of transformer 22 is fed to the output side via secondary winding 22*b* of transformer 22 and diode 10. The current that flows through switching device 17 decreases gradually to zero. Since switching device 17 is brought into the OFF-state thereof after the current that flows through switching device 17 reaches zero, switching device 17 performs soft switching at the state of the turn-OFF thereof.

When switching device 15 is turned off, the voltage of switching device 15 rises gradually due to the current flowing through capacitor 31. Therefore, the turn-OFF losses are reduced. Thus, switching devices 15 and 17 perform soft switching.

In a period t4, a reset voltage equal to the voltage clamped by voltage clamping element 30 is caused across primary winding 22*a* of transformer 22. A voltage, which is as high as the product of the reset voltage and the winding ratio of transformer 22, is generated across secondary winding 22*b* of transformer 22. The sum of the DC output voltage and the voltage across secondary winding 22*b* of transformer 22 is applied to diode 10. By setting the clamping voltage of voltage clamping element 30 to be low, the voltage applied to diode 10 is reduced.

FIG. 4A is a circuit diagram of another conventional electric power converter disclosed in the Patent Document 1.

In FIG. 4A, a rectifier circuit is configured by reactor 21, diodes 2 through 5, and switching devices 15 and 16. Switching device 15 and capacitor 31 are connected in parallel to diode 3. Switching device 16 and capacitor 32 are connected in parallel to diode 5. AC power supply 1 is connected between the series connection point of diodes 2 and 3 and the series connection point of diodes 4 and 5 via reactor 21. Capacitor 33 and load 34 are connected between the DC terminals of the diode bridge circuit.

The parasitic diode of switching device 15 may be used in substitution for diode 3. The parasitic diode of switching device 16 may be used in substitution for diode 5. The soft switching circuit for the rectifier circuit is configured by diodes 7 through 10, switching device 17, transformer 20, and voltage clamping element 30.

FIG. 4B is a wave chart describing the operations of the circuit shown in FIG. 4A.

As switching device 15 is turned on when the AC power supply voltage is positive, the AC input current, circulating from AC power supply 1 to AC power supply 1 via reactor 21, switching device 15, and diode 5, increases while storing energy in reactor 21. Then, as switching device 15 is turned off, the energy stored in reactor 21 is fed to the DC output side via a path connecting reactor 21, diode 2, capacitor 33, diode 5, AC power supply 1 and reactor 21. Therefore, it is possible to convert an AC power supply voltage to an arbitrary DC voltage by controlling the ON and OFF of switching device 15 when the AC power supply voltage is positive. In the same manner, it is possible to convert an AC power supply voltage to an arbitrary DC voltage by controlling the ON and OFF of switching device 16 when the AC power supply voltage is negative.

In FIG. 4A, diodes 7 and 8 are disposed in substitution for diode 7 in FIG. 3A. In FIG. 4A, diode 8 works for diode 7 in FIG. 3A, when the AC power supply voltage is positive. Diode 7 works for diode 7 in FIG. 3A, when the AC power supply voltage is negative. Since switching device 15 is turned on and off when the AC power supply voltage is positive, the electric charge stored in capacitor 31 is regenerated to the DC output side through the operations similar to the operations conducted in the circuit shown in FIG. 3A. Since a current always flows through diode 5 when the AC power supply voltage is positive, capacitor 32 stores no electric charge.

When the AC power supply voltage is negative, the electric charge stored in capacitor 32 is regenerated to the load side through the operations similar to the operations conducted in the circuit shown in FIG. 3A. Therefore, the circuit shown in FIG. 4A conducts operations similar to the operations conducted by the circuit shown in FIG. 3A. Switching devices 15, 16, and 17 and diodes 2 and 4 conduct soft switching. Since the sum of the DC output voltage and the secondary winding voltage of transformer 22 is applied to diode 10 in the circuit shown in FIG. 4A in the same manner as in FIG. 3A, the voltage applied to diode 10 is reduced by setting the clamping voltage of voltage clamping element 30 to be low.

For performing two-way electric power conversion, Patent Document 2: Japanese Unexamined Patent Application Publication No. Sho 64 (1989)-064557 discloses a combination of a buck chopper and a boost chopper. For the boost chopper, a boost chopper including an auxiliary chopper and disclosed in Patent Document 3: Japanese Unexamined Patent Application Publication No. Hei 05 (1993)-328714 may be used. However, the boost chopper including an auxiliary chopper and disclosed in the Patent Document 3 includes many circuit component parts. Moreover, the boost chopper including an auxiliary chopper and disclosed in the Patent Document 3 is large in size and expensive.

For realizing two-way electric power conversion in the conventional circuit shown in FIG. 3A, it is necessary to replace diode 6 by a switching device. For realizing two-way electric power conversion in the conventional circuit shown in FIG. 4A, it is necessary to replace diodes 2 and 4 by switching devices. The replacing switching device or the replacing switching devices can not perform soft switching.

In view of the foregoing, it would be desirable to obviate the problems described above, and to provide a two-way electric power converter that facilitates conducting soft switching operations inexpensively with low conversion losses.

Further objects and advantages of the invention will be apparent from the following description of the invention.

SUMMARY OF THE INVENTION

According to the subject matter of a first aspect of the invention, there is provided an electric power converter including:

a first series circuit including a reactor and a first switching device, the first series circuit being connected between DC input terminals;

a second series circuit including a second switching device and an output capacitor including a terminal working for a DC output terminal, the second series circuit being connected in parallel to the first switching device;

a load connected in parallel to the output capacitor;

a third series circuit including a first capacitor, a first diode, a primary winding of a transformer, and a third switching device, the third series circuit being connected in parallel to the first switching device;

a fourth series circuit including a second capacitor, a fourth switching device, the primary winding of the transformer, and a second diode, the fourth series circuit being connected in parallel to the second switching device;

a fifth series circuit including a third diode and the secondary winding of the transformer, the fifth series circuit being connected between the DC output terminals; and a voltage clamping means connected in parallel to the primary winding of the transformer.

According to the subject matter of a second aspect of the invention, there is provided an electric power converter including:

an AC power supply;

a first series circuit including a first switching device and a second switching device connected in series to each other via an internal connection point, N pieces of the first series circuits being connected in parallel to each other, said N being a nonnegative integer equal to or more than 2;

a reactor connected between the AC power supply and the internal connection point in the first one of the first series circuits;

an output capacitor including a DC output terminal, the DC output terminals being connected between the parallel connection points of the N pieces of the first series circuits;

a load connected between the DC output terminals of the output capacitor;

the first series circuit including a first capacitor and a second capacitor connected in parallel to the first switching device and the second switching device, respectively;

a first diode including an anode terminal connected to the internal connection point of the first series circuit and a cathode terminal, the cathode terminals of the first diodes being connected collectively;

a second series circuit including the primary winding of a transformer and a third switching device; the second series circuit being connected between the cathode terminals of the first diodes and the DC output terminal;

a second diode including a cathode terminal connected to the internal connection point of the first series circuit and an anode terminal, the anode terminals of the second diodes being connected collectively;

a third series circuit including the primary winding of the transformer and a fourth switching device, the third series circuit being connected between the anode terminals of the second diodes and the DC output terminal;

a fourth series circuit including a third diode and the secondary winding of the transformer, the fourth series circuit being connected between the DC output terminals; and a voltage clamping means connected in parallel to the primary winding of the transformer.

The electric power converter according to the invention that conducts two-way electric power conversion facilitates performing soft switching with a minimal circuit added thereto and reducing the losses caused thereby.

DETAILED DESCRIPTION OF PREFERRED EMBODIMENTS

Now, the invention will be described in detail hereinafter with reference to the accompanied drawings which illustrate the preferred embodiments of the invention.

Figure 1A:
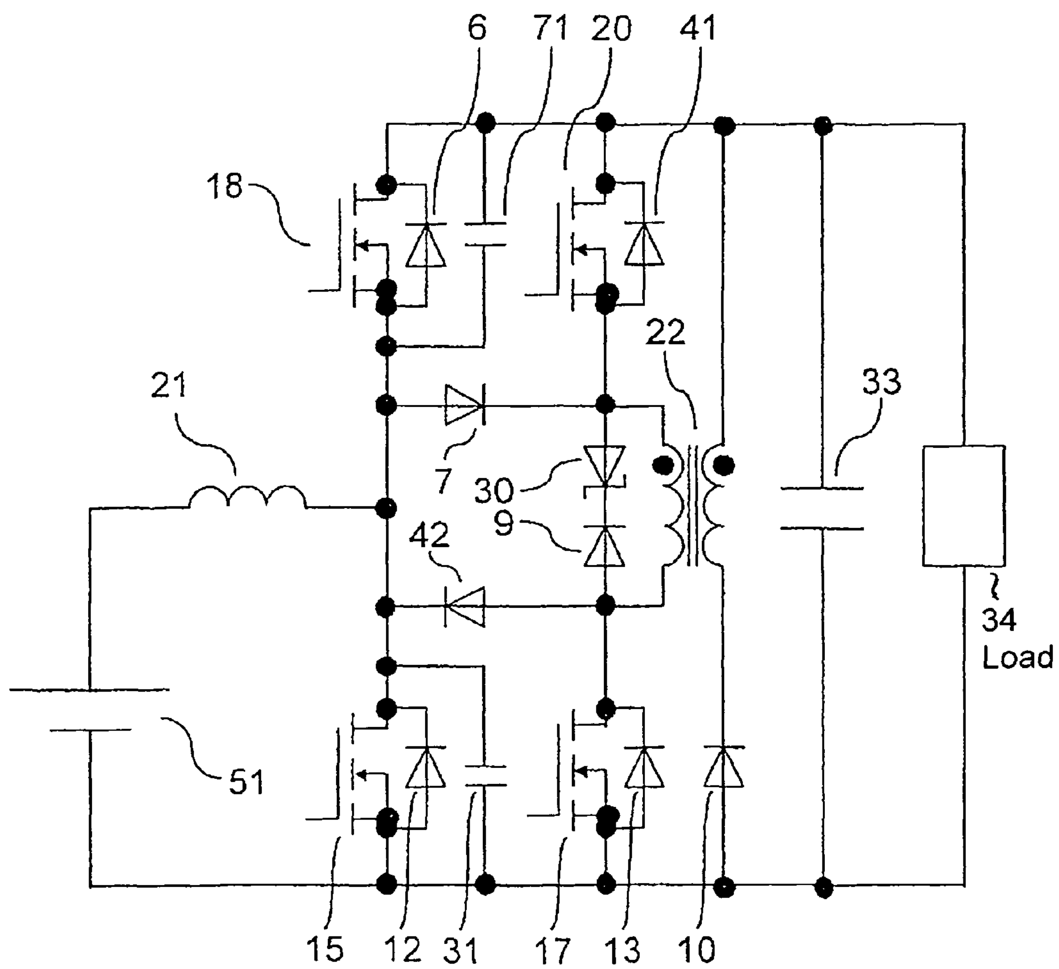
FIG. 1A is a circuit diagram showing the circuit configuration of an electric power converter according to a first embodiment of the invention.

FIG. 1A is a circuit diagram showing the circuit configuration of an electric power converter according to a first embodiment of the invention.

In the circuit shown in FIG. 1A, DC power supply 51 is employed in substitution for AC power supply 1 and rectifier circuit 40. Switching device 18 is connected in parallel to diode 6. DC power supply 51, reactor 21, diodes 6 and 12, and switching devices 15 and 18 constitute a chopper circuit.

By turning on and off switching device 15 in the chopper circuit described above, electric power is fed from the DC power supply side to the load side. By turning on and off switching device 18 in the chopper circuit described above, electric power is regenerated from the load side to the DC power supply side. A soft switching circuit is configured by diodes 7, 9, 10, 41, and 42; switching devices 17 and 20; transformer 22; and voltage clamping element 30.

Figure 3A:
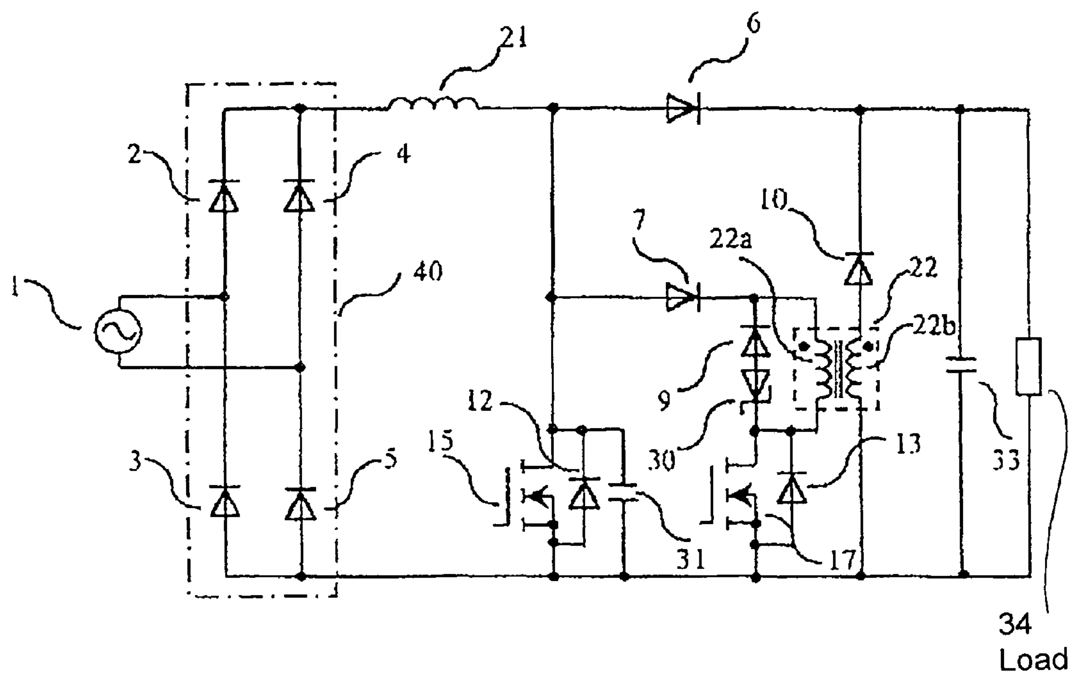
FIG. 3A is a circuit diagram of a conventional electric power converter.
Figure 3B:
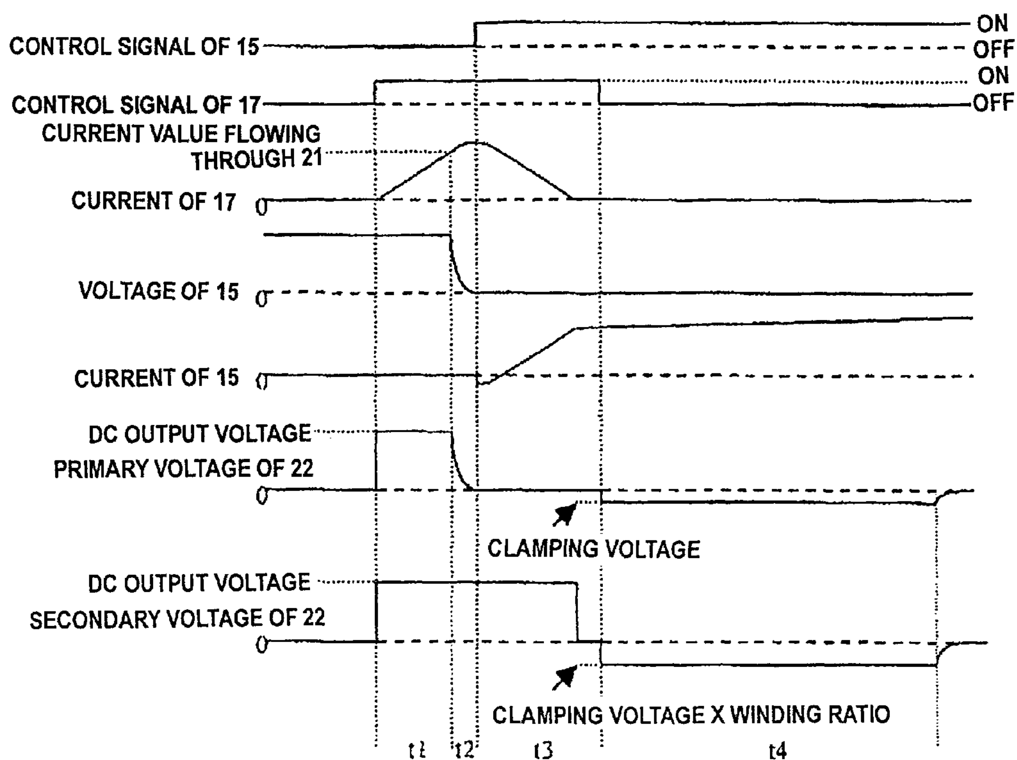
FIG. 3B is a wave chart describing the operations of the circuit shown in FIG. 3A.

For feeding electric power from the DC power supply side to the load side, switching devices 15 and 17 and diode 6 are made to conduct soft switching in the same manner as in the circuit shown in FIG. 3A. The electric power converter according to the first embodiment is different from the conventional electric power converters in that the electric power converter according to the first embodiment makes it possible to conduct soft switching in regenerating electric power from the load side to the DC power supply side by adding a few circuit component parts. Now the regeneration operation conducted by the electric power converter according to the first embodiment will be described in detail below.

By turning on switching device 18 in FIG. 1A, the energy stored in capacitor 33 is transferred to reactor 21 via switching device 18 and regenerated to DC power supply 51. Then, as switching device 18 is turned off, the energy transferred to reactor 21 is regenerated to DC power supply 51 through a path connecting reactor 21, DC power supply 51, and diode 12. Thus, the energy stored in the capacitor on the load side is regenerated to the DC power supply side by controlling the ON and OFF of switching device 18.

Capacitor 71; diodes 9, 10, 41, and 42; voltage clamping element 30, transformer 22; and switching device 20 form a soft switching circuit for the regeneration operation mode that regenerates electric power from the load side to the DC power supply side. In the same manner as in FIG. 3A, diodes 9 and 10; voltage clamping element 30; and transformer 22 are employed also for configuring a soft switching circuit for the operation mode that feeds electric power from the DC power supply side to the load side.

Figure 1B:
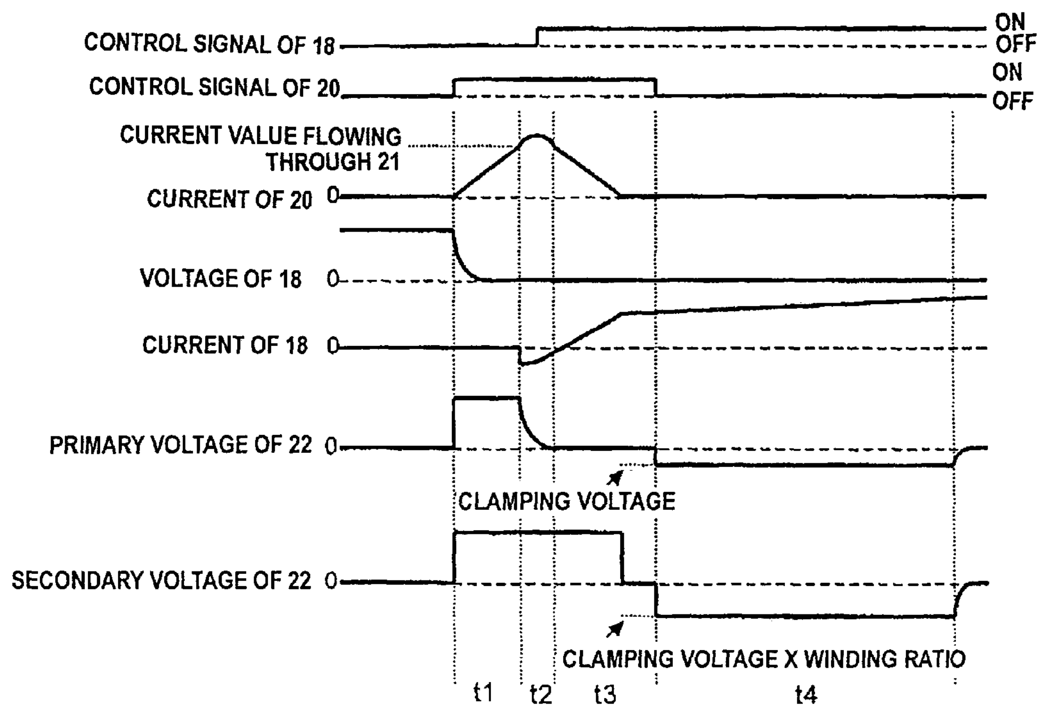
FIG. 1B is a wave chart describing the operations of the circuit shown in FIG. 1A.

FIG. 1B is a wave chart describing the operations of the circuit shown in FIG. 1A.

As switching device 20 is turned on, the electric charge stored in capacitor 71 (or in the parasitic capacitance of switching device 18) is discharged in a period t1 through a path connecting capacitor 71, switching device 20, the primary winding of transformer 22, and diode 42. At the same time, the electric charge stored in capacitor 71 is regenerated to the output side via the secondary winding of transformer 22 and diode 10. Since the current flowing through switching device 20 gradually increases due to the leakage inductance of transformer 22, switching device 20 performs soft switching during the state of the turn-ON thereof.

As soon as the current value flowing through switching device 20 becomes equal to the current value flowing through reactor 21, a period t2 starts and diode 12 becomes OFF. Since the current flowing through diode 12 decreases gradually to zero, the surge voltage caused by the reverse recovery and the reverse recovery losses are reduced. As switching device 18 is turned on in a period t3 after the voltage of switching device 18 becomes zero, a difference current, equal to the difference between the current flowing through the primary winding of transformer 22 and the current flowing through reactor 21, flows through switching device 18. Since the difference current that flows through switching device 18 initially flows through diode 6, the current that flows through switching device 18 gradually increases from a negative value. Therefore, switching device 18 performs soft switching during the state of the turn-ON thereof.

When switching device 15 is turned off, the voltage of switching device 15 rises gradually due to the current flowing through capacitor 31. Therefore, the turn-OFF losses are reduced. Thus, switching devices 15 and 18 perform soft switching at the turn-OFF thereof. In a period t4, a reset voltage equal to the voltage clamped by voltage clamping element 30 is caused across the primary winding of transformer 22. A voltage, which is as high as the product of the reset voltage and the winding ratio of transformer 22, is generated across the secondary winding of transformer 22. The sum of the DC output voltage and the voltage across the secondary winding of transformer 22 is applied to diode 10. By setting the clamping voltage of voltage clamping element 30 to be low, the voltage applied to diode 10 is reduced.

Figure 2A:
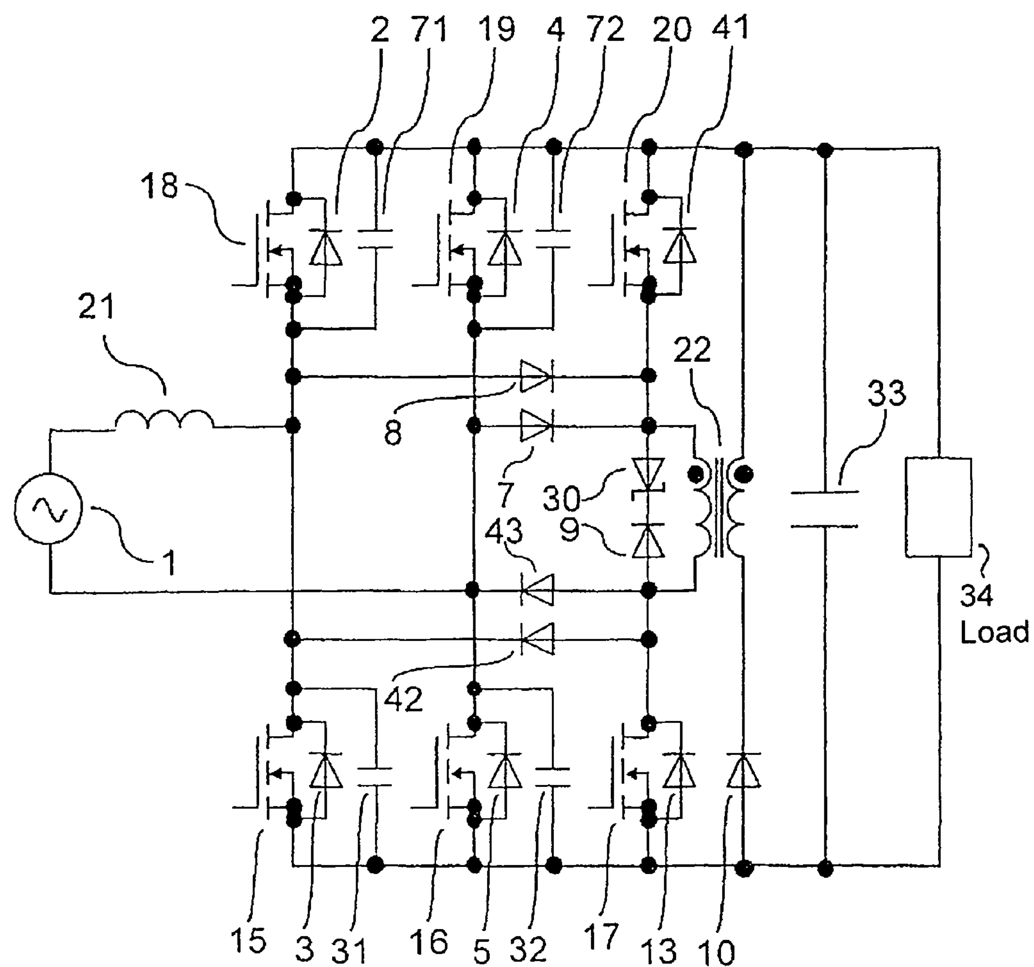
FIG. 2A is a circuit diagram showing the circuit configuration of an electric power converter according to a second embodiment of the invention.

FIG. 2A is a circuit diagram showing the circuit configuration of an electric power converter according to a second embodiment of the invention.

As shown in FIG. 2A, a rectifier circuit is configured by reactor 21, diodes 2 through 5, and switching devices 15, 16, 18 and 19. Switching device 18 and capacitor 71 are connected in parallel to diode 2 in a diode bridge circuit configured by diodes 2 through 5. Switching device 15 and capacitor 31 are connected in parallel to diode 3 in the diode bridge circuit. Switching device 19 and capacitor 72 are connected in parallel to diode 4 in the diode bridge circuit. Switching device 16 and capacitor 32 are connected in parallel to diode 5 in the diode bridge circuit. AC power supply 1 is connected between the series connection point of diodes 2 and 3 and the series connection point of diodes 4 and 5 via reactor 21. Diodes 2 through 5 may be replaced by the parasitic diodes of switching devices 15, 16, 18, and 19, respectively.

Diodes 7 through 10, 13, 41 through 43; switching devices 17 and 20; transformer 22; and voltage clamping element 30 form a soft switching circuit. In detail, the soft switching circuit is configured in the following manner. The anode of diode 8 is connected to the series connection point of diodes 2 and 3. The anode of diode 7 is connected to the series connection point of diodes 4 and 5. The cathode of diode 42 is connected to the series connection point of diodes 2 and 3. The cathode of diode 43 is connected to the series connection point of diodes 4 and 5. The cathodes of diodes 7 and 8 and the source terminal of switching device 20, to which diode 41 is connected in parallel, are connected to the first terminal of the primary winding in transformer 22. The anodes of diodes 42 and 43 and the drain terminal of switching device 17, to which diode 13 is connected in parallel, are connected to the second terminal of the primary winding in transformer 22. The drain terminal of switching device 20 is connected to the positive terminal of the DC output. The source terminal of switching device 17 is connected to the negative terminal of the DC output. A series circuit of diode 9 and voltage clamping element 30 is connected in parallel to the primary winding of transformer 22. A series circuit of diode 10 and the secondary winding of transformer 22 is connected in parallel to capacitor 33, that is the DC output. The parasitic diodes of switching devices 17 and 20 may be employed in substitution for diodes 13 and 41 with no problem.

Figure 4A:
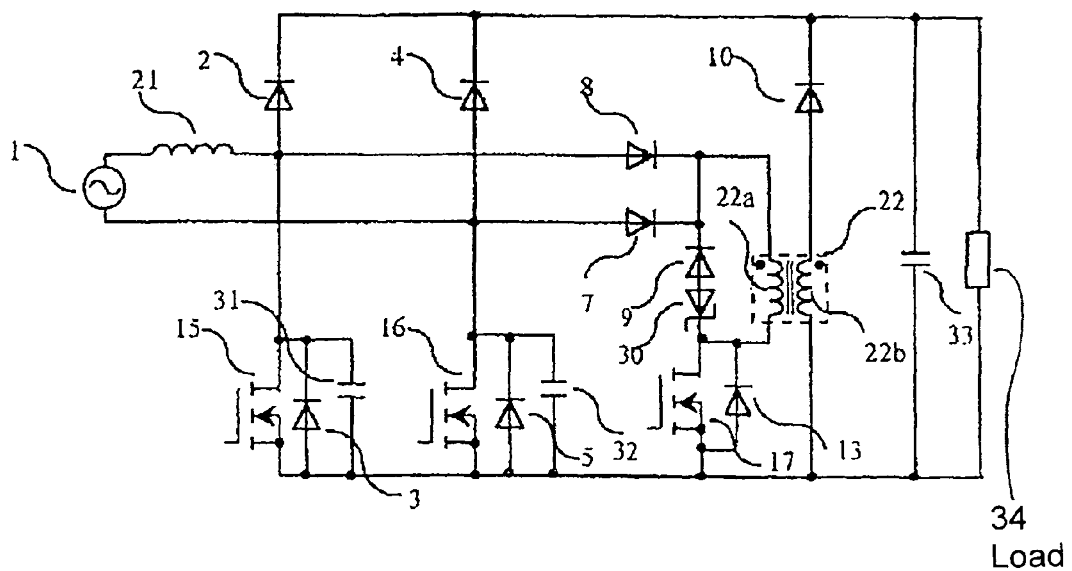
FIG. 4A is a circuit diagram of another conventional electric power converter.
Figure 4B:
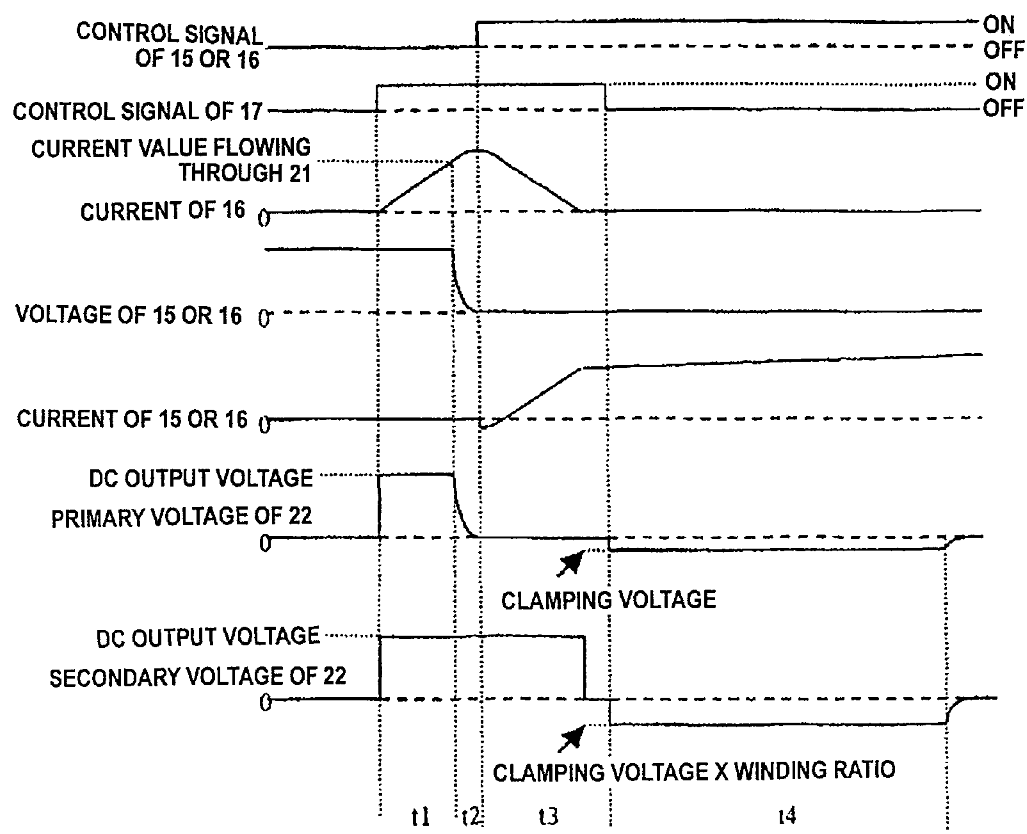
FIG. 4B is a wave chart describing the operations of the circuit shown in FIG. 4A.

In feeding electric power from the AC power supply side to the load side in the circuit shown in FIG. 2A, soft switching is performed by switching devices 15 through 17 and diodes 2 and 4 in the same manner as in the conventional circuit shown in FIG. 4A. The circuit shown in FIG. 2A is different from the conventional circuit shown in FIG. 4A in that the circuit shown in FIG. 2A facilitates performing soft switching even in regenerating electric power from the load side to the AC power supply side with a few circuit component parts added thereto.

As switching devices 16 and 18 are turned on when the AC power supply voltage is positive in the circuit configuration shown in FIG. 2A, the energy stored in capacitor 33 is transferred to reactor 21 through a path connecting capacitor 33, switching device 18, reactor 21, AC power supply 1, and switching device 16 and regenerated to AC power supply 1. Then, by turning off switching device 18, the energy transferred to reactor 21 is regenerated to AC power supply 1 through a path connecting reactor 21, AC power supply 1, switching device 16 and diode 3.

As switching devices 19 and 15 are turned on when the AC power supply voltage is negative in the circuit configuration shown in FIG. 2A, the energy stored in capacitor 33 is transferred to reactor 21 through a path connecting capacitor 33, switching device 19, AC power supply 1, reactor 21, and switching device 15 and regenerated to AC power supply 1. Then, by turning off switching device 19, the energy transferred to reactor 21 is regenerated to AC power supply 1 through a path connecting reactor 21, AC power supply 1, switching device 15 and diode 5. Thus, by controlling the ON and OFF of switching device 18 or 19, the energy stored on the load side is regenerated to the AC power supply side.

Capacitors 71 and 72, diodes 9, 10, 41 through 43, voltage clamping element 30, transformer 22, and switching device 20 form a soft switching circuit for the regeneration operation mode that regenerates electric power from the load side to the AC power supply side. In the same manner as described with reference to FIG. 4A, diodes 9 and 10, voltage clamping element 30, and transformer 22 are employed also for configuring a soft switching circuit for the operation mode that feeds electric power from the AC power supply side to the load side.

Figure 2B:
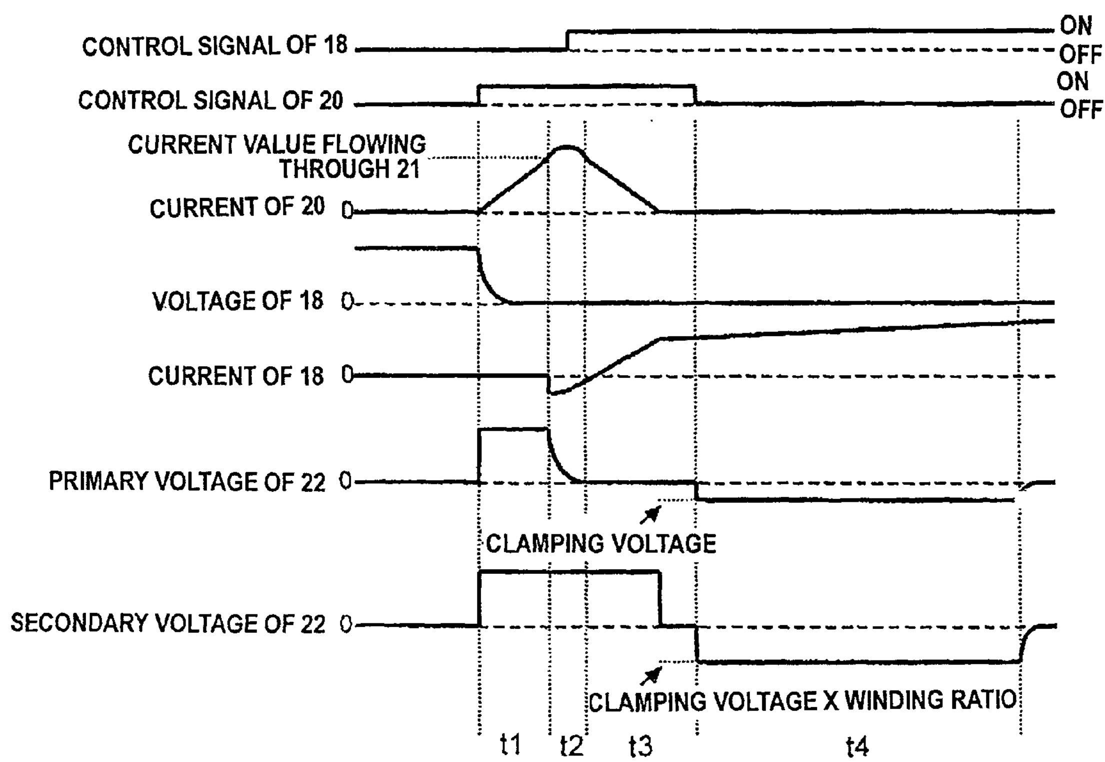
FIG. 2B is a wave chart describing the operations of the circuit shown in FIG. 2A.
Figure 2C:
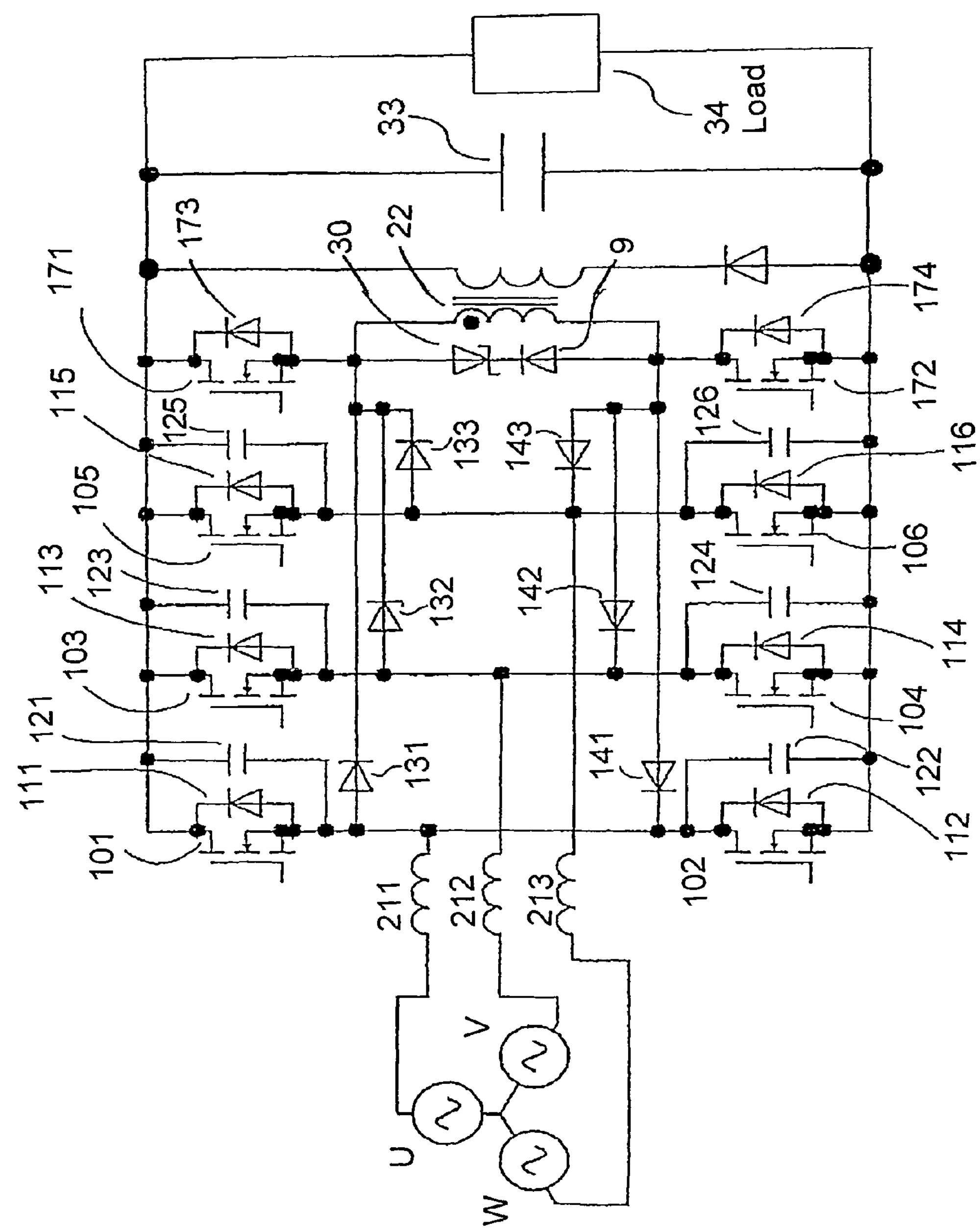
FIG. 2C is a circuit diagram showing the circuit configuration of an electric power converter according to a third embodiment of the invention.

FIG. 2C is a circuit diagram showing the circuit configuration of an electric power converter according to a third embodiment of the invention.

As shown in FIG. 2C, reactors 211 through 213 are connected to each phase of a three-phase AC power supplies. A rectifier circuit is configured by diodes 111 through 116 and switching devices 101 through 106, and a rectifier diode bridge circuit configured by diodes 111 through 116. Switching device 101 and capacitor 121 are connected in parallel to diode 111. Switching devices 102 through 106 and capacitors 122 through 126 are connected in parallel to diodes 112 through 116, respectively. AC power supplies are connected between the series connection point of diodes 111 and 112 via reactor 211. AC power supplies are connected between the series connection point of diodes 113 and 114 and the series connection point of diodes 115 and 116 via reactors 212 and 213, respectively. Diodes 111 through 116 may be replaced by the parasitic diodes of switching devices 101 through 106, respectively.

Diodes 9, 10, 131 through 133, 173, 174, and 141 through 143, switching devices 171 and 172, transformer 22, and voltage clamping element 30 form a soft switching circuit.

In detail, the soft switching circuit is configured in the following manner. The anode of diode 131 is connected to the series connection point of diodes 111 and 112. The anode of diode 132 is connected to the series connection point of diodes 113 and 114. The anode of diode 133 is connected to the series connection point of diodes 115 and 116. The cathode of diode 141 is connected to the series connection point of diodes 111 and 112. The cathode of diode 142 is connected to the series connection point of diodes 113 and 114. The cathode of diode 143 is connected to the series connection point of diodes 115 and 116. The cathodes of diodes 131 through 133 and the source terminal of switching device 171, to which diode 173 is connected in parallel, are connected to the first terminal of the primary winding in transformer 22. The anodes of diodes 141 through 143 and the drain terminal of switching device 172, to which diode 174 is connected in parallel, are connected to the second terminal of the primary winding in transformer 22. The drain terminal of switching device 171 is connected to the positive terminal of the DC output. The source terminal of switching device 172 is connected to the negative terminal of the DC output. A series circuit of diode 9 and voltage clamping element 30 is connected in parallel to the primary winding of transformer 22. A series circuit of diode 10 and the secondary winding of transformer 22 is connected in parallel to capacitor 33, that is the DC output. The parasitic diodes of switching devices 171 and 172 may be employed in substitution for diodes 173 and 174 with no problem.

In feeding electric power from the AC power supply side to the load side or from the load side to the AC power supply side shown in FIG. 2C, soft switching is performed by switching devices 101 through 106, 171, and 172, and diodes 111 through 116. The operation is described as follows.

As switching devices 101 and 104 are turned on when the U-phase of AC power supply voltage is positive in the circuit configuration shown in FIG. 2C, the energy stored in capacitor 33 is transferred to reactors 211 and 212 through a path connecting capacitor 33, switching device 101, reactor 211, AC power supply, reactor 212, and switching device 104 and regenerated to AC power supply. Then, by turning off switching device 101, the energy transferred to reactor 211 is regenerated to AC power supply through a path connecting reactor 211, AC power supply, reactor 212, switching device 104, and diode 112.

As switching devices 113 and 112 are turned on when the U-phase of AC power supply voltage is negative in the circuit configuration shown in FIG. 2C, the energy stored in capacitor 33 is transferred to reactors 211 and 212 through a path connecting capacitor 33, switching device 113, reactor 212, AC power supply, reactor 211, and switching device 102 and regenerated to AC power supply. Then, by turning off switching device 113, the energy transferred to reactors 211 and 212 are regenerated to AC power supply through a path connecting reactor 212, AC power supply, reactor 211, switching device 112, and diode 113. Thus, by controlling the ON and OFF of switching devices 101 through 106, the energy stored on the load side is regenerated to the AC power supply side.

Capacitors 121 through 124, diodes 9, 10, 173, 174, 131, 132, 141, and 142, voltage clamping element 30, transformer 22, and switching devices 171 and 172 form a soft switching circuit for the regeneration operation mode that regenerates electric power from the load side to the AC power supply side. In the same manner as described with reference to FIG. 4A, diodes 9 and 10, voltage clamping element 30, and transformer 22 are employed also for configuring a soft switching circuit for the operation mode that feeds electric power from the AC power supply side to the load side.

Figure 2D:
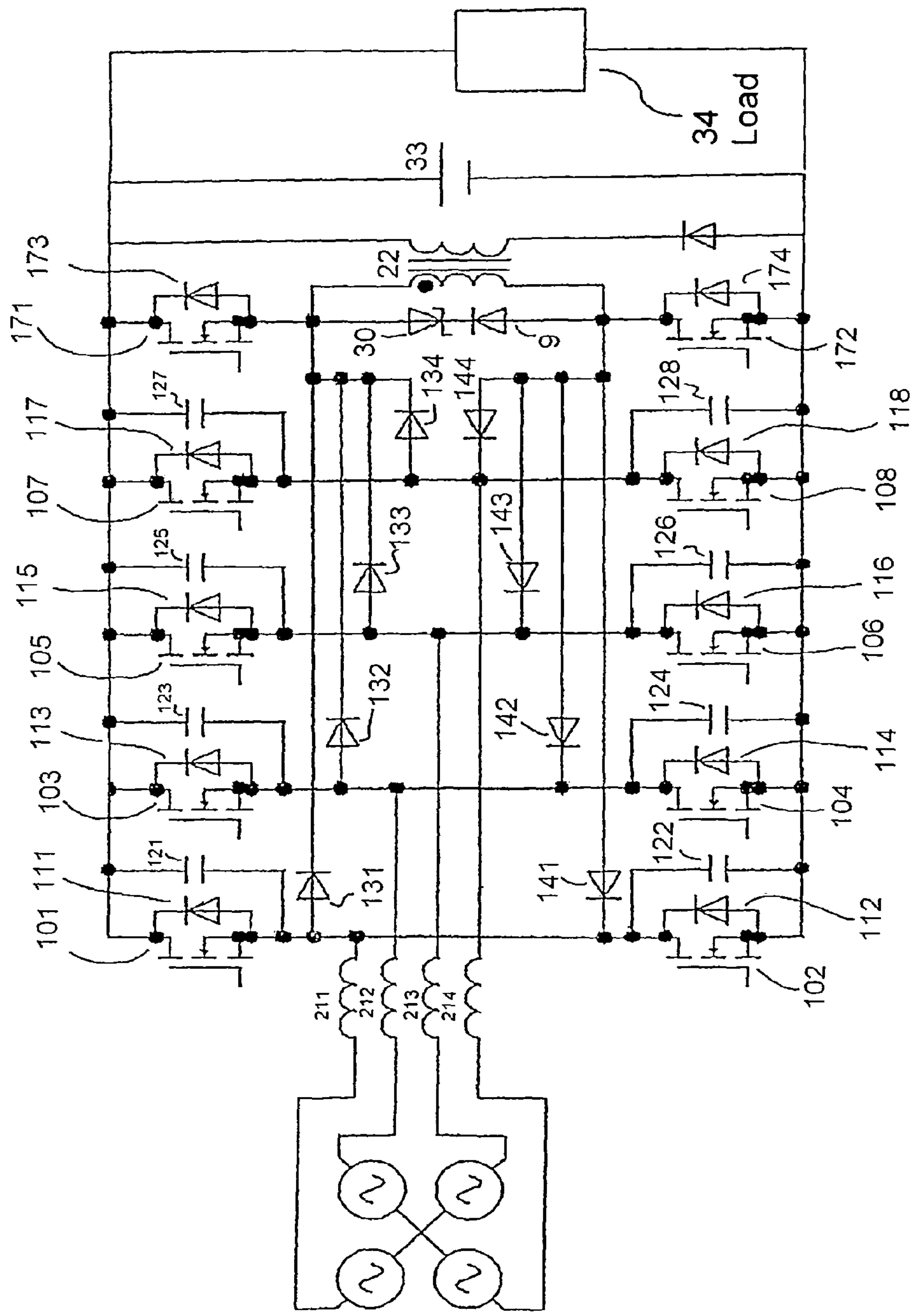
FIG. 2D is a circuit diagram showing the circuit configuration of an electric power converter according to a fourth embodiment of the invention.

FIG. 2D is a circuit diagram showing the circuit configuration of an electric power converter according to a fourth embodiment of the invention.

As shown in FIG. 2D, reactors 211 through 214 are connected to each phase of a four-phase AC power supplies. A rectifier circuit is configured by diodes 111 through 118 and switching devices 101 through 108, and a rectifier diode bridge circuit configured by diodes 111 through 118. Switching device 101 and capacitor 121 are connected in parallel to diode 111. Switching devices 102 through 108 and capacitors 122 through 128 are connected in parallel to diodes 112 through 118, respectively. AC power supplies are connected between the series connection point of diodes 111 and 112 via reactor 211. AC power supplies are connected between the series connection point of diodes 113 and 114, the series connection point of diodes 115 and 116, and the series connection point of diodes 117 and 118 via reactors 212, 213, and 214, respectively. Diodes 111 through 118 may be replaced by the parasitic diodes of switching devices 101 through 108, respectively.

Diodes 9, 10, 131 through 134, 173, 174, and 141 through 144, switching devices 171 and 172, transformer 22, and voltage clamping element 30 form a soft switching circuit.

In detail, the soft switching circuit is configured in the following manner. The anode of diode 131 is connected to the series connection point of diodes 111 and 112. The anode of diode 132 is connected to the series connection point of diodes 113 and 114. The anode of diode 133 is connected to the series connection point of diodes 115 and 116. The anode of diode 134 is connected to the series connection point of diodes 117 and 118. The cathode of diode 141 is connected to the series connection point of diodes 111 and 112. The cathode of diode 142 is connected to the series connection point of diodes 113 and 114. The cathode of diode 143 is connected to the series connection point of diodes 115 and 116. The cathode of diode 144 is connected to the series connection point of diodes 117 and 118. The cathodes of diodes 131 through 134 and the source terminal of switching device 171, to which diode 173 is connected in parallel, are connected to the first terminal of the primary winding in transformer 22. The anodes of diodes 141 through 144 and the drain terminal of switching device 172, to which diode 174 is connected in parallel, are connected to the second terminal of the primary winding in transformer 22. The drain terminal of switching device 171 is connected to the positive terminal of the DC output. The source terminal of switching device 172 is connected to the negative terminal of the DC output. A series circuit of diode 9 and voltage clamping element 30 is connected in parallel to the primary winding of transformer 22. A series circuit of diode 10 and the secondary winding of transformer 22 are connected in parallel to capacitor 33, that is the DC output. The parasitic diodes of switching devices 171 and 172 may be employed in substitution for diodes 173 and 174 with no problem.

In feeding electric power from the AC power supply side to the load side or from the load side to the AC power supply side shown in FIG. 2D, soft switching is performed by switching devices 101 through 108, 171, and 172, and diodes 111 through 118. The operation is described as follows.

In FIG. 2D, in the same manner as described in FIG. 2C, as switching devices are turned on based on the voltage of each phase of the AC power supplies, the energy stored in capacitor 33 is transferred to reactors 211 through 214 through a path connecting capacitor 33, switching device (such as 101), reactor (such as 211), AC power supply, reactor (such as 212), and switching device (104) and regenerated to AC power supply. Then, by turning off switching device (such as 101), the energy transferred to reactor is regenerated to AC power supply through a path connecting reactor (211), AC power supply, reactor (212), switching device (104), and diode (112).

Thus, by controlling the ON and OFF of switching devices 101 through 108, the energy stored on the load side is regenerated to the AC power supply side.

Capacitors 121 through 124, diodes 9, 10, 173, 174, 131, 132, 141, and 142, voltage clamping element 30, transformer 22, and switching devices 171 and 172 form a soft switching circuit for the regeneration operation mode that regenerates electric power from the load side to the AC power supply side. In the same manner as described with reference to FIG. 4A, diodes 9 and 10, voltage clamping element 30, and transformer 22 are employed also for configuring a soft switching circuit for the operation mode that feeds electric power from the AC power supply side to the load side.

FIG. 2B is a wave chart describing the operations of the circuit shown in FIG. 2A.

By turning on switching device 20 when the AC power supply voltage is positive, the electric charge stored in capacitor 71 (or in the parasitic capacitance of switching device 18) is discharged in a period t1 through a path connecting capacitor 71, switching device 20, the primary winding of transformer 22, and diode 42. At the same time, the electric charge stored in capacitor 71 is regenerated to the output side via the secondary winding of transformer 22 and diode 10. Since the current flowing through switching device 20 increases gradually from zero due to the leakage inductance of transformer 22, switching device 20 performs soft switching at the turn-ON thereof.

As soon as the current value flowing through switching device 20 becomes equal to the current value flowing through reactor 21, a period t2 starts and diode 3 becomes OFF. Since the current flowing through diode 3 decreases gradually to zero, the surge voltage caused by the reverse recovery and the reverse recovery losses are reduced. As switching device 18 is turned on in a period t3 after the voltage of switching device 18 becomes zero, a difference current, equal to the difference between the current flowing through the primary winding of transformer 22 and the current flowing through reactor 21, flows through switching device 18. Since the difference current that flows through switching device 18 initially flows through diode 2, the current flowing through switching device 18 increases gradually from a negative value. Therefore, switching device 18 performs soft switching at the turn-ON thereof.

When switching device 18 is turned off, the voltage of switching device 18 rises gradually due to the current flowing through capacitor 71. Therefore, the turn-OFF losses are reduced. Thus, switching devices 18 and 20 perform soft switching.

In a period t4, a reset voltage equal to the voltage clamped by voltage clamping element 30 is caused across the primary winding of transformer 22. A voltage, which is as high as the product of the reset voltage and the winding ratio of transformer 22, is generated across the secondary winding of transformer 22. The sum of the DC output voltage and the voltage across the secondary winding of transformer 22 is applied to diode 10. By setting the clamping voltage of voltage clamping element 30 to be low, the voltage applied to diode 10 is reduced.

When the AC power supply voltage is negative, the electric charges stored in capacitor 72 are regenerated to the load side in the same manner as described above. Therefore, the rectifier circuit in FIG. 2A works in the same manner as the rectifier circuit in FIG. 1A. Switching devices 15 through 20 and diodes 2 through 5 perform soft switching.

The Disclosure of Japanese Patent Application No. 2008-047706 filed on Feb. 28, 2008 is incorporated in the application.

While the invention has been explained with reference to the specific embodiments of the invention, the explanation is illustrative and the invention is limited only by the appended claims.

What is claimed is:

1. An electric power converter, comprising:

a first series circuit including a reactor and a first switching device, and adapted to be connected between DC input terminals of a DC power supply;

a second series circuit including a second switching device and an output capacitor having DC output terminals, and connected in parallel with the first switching device, a load being adapted to be connected in parallel with the output capacitor;

a first capacitor arranged parallel to the first switching device;

a transformer having a primary winding, and a secondary winding connected in parallel with the output capacitor;

a third series circuit including a first diode, the primary winding of the transformer and a third switching device, and connected in parallel with the first switching device;

a second capacitor arranged parallel to the second switching device;

a fourth series circuit including, a fourth switching device, the primary winding and a second diode, and connected in parallel with the second switching device;

a fifth series circuit including a third diode and the secondary winding of the transformer, and connected between the DC output terminals; and a voltage clamping device connected in parallel with the primary winding of the transformer.

2. An electric power converter, comprising:

N parts of first series circuits connected in parallel to each other where N is a nonnegative integer equal to or more than 2 to form parallel connection points, each of the first series circuits including a first switching device and a second switching device connected in series via an internal connection point thereof, and a first capacitor and a second capacitor connected in parallel to the first switching device and the second switching device, respectively;

a reactor connected at one side to the internal connection point of one of the first series circuits and at the other side to an N phase AC power supply;

an output capacitor having DC output terminals and connected to the parallel connection points of the first series circuits, a load being connected between the DC output terminals;

a transformer having a primary winding, and a secondary winding;

first diodes, each diode having an anode terminal connected to the internal connection point of each of the first series circuits and a cathode terminal, said cathode terminals of the first diodes being connected together;

second diodes, each diode having a cathode terminal connected to the internal connection point of each of the first series circuits and an anode terminal, said anode terminals of the second diodes being connected together;

a second series circuit including a third switching device and the primary winding of the transformer, and connected between the cathode terminals of the first diodes and one of the DC output terminals;

a third series circuit including a fourth switching device and the primary winding of the transformer, and connected between the anode terminals of the second diodes and the other of the DC output terminals;

a fourth series circuit including a fifth diode and the secondary winding of the transformer, and connected between the DC output terminals; and a voltage clamping device connected in parallel to the primary winding of the transformer.

3. An electric power converter according to claim 2, wherein two first series circuits are arranged parallel to each other, the output capacitor being connected between a connecting point of the first switching devices and a connecting point of the second switching devices in the two first series circuits.

* * * * *